UNITED STATES PATENT OFFICE.

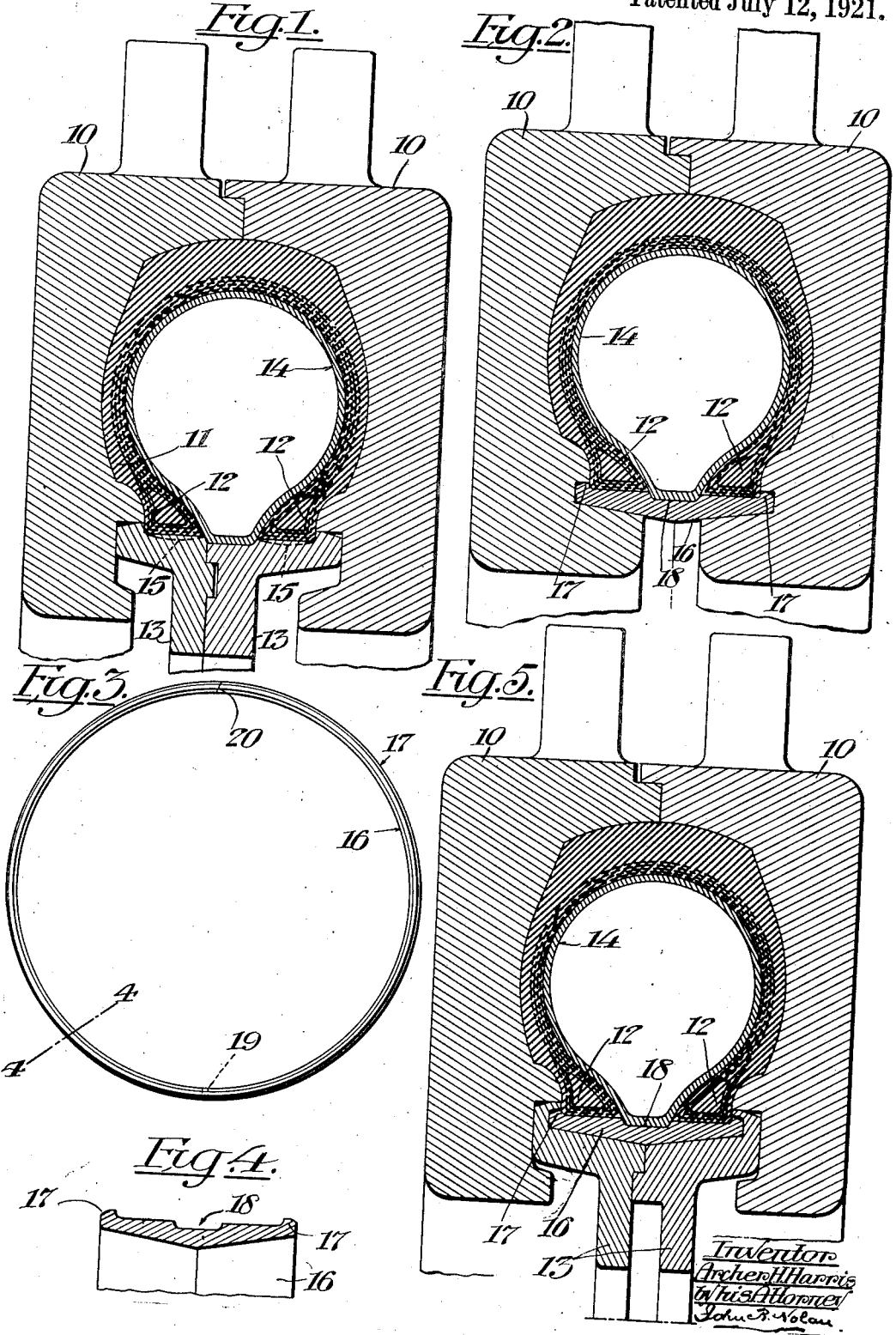

ARCHER H. HARRIS, OF BARBERTON, OHIO, ASSIGNOR OF ONE-HALF TO EVAN A. ARMSTRONG, OF AKRON, OHIO.

TIRE-SUPPORTING DEVICE FOR TIRE-MOLDS.

1,384,463.   Specification of Letters Patent.   Patented July 12, 1921.

Application filed December 9, 1920. Serial No. 429,311.

*To all whom it may concern:*

Be it known that I, ARCHER H. HARRIS, a citizen of the United States, and resident of Barberton, in the county of Summit and State of Ohio, have invented certain new and useful Improvements in Tire-Supporting Devices for Tire-Molds, of which the following is a specification.

In the manufacture of "cord tires" for vehicle wheels it is the usual practice to build raw rubber and cord ply upon ply on a collapsible core, and then to remove the core from, and to insert an air bag in the hollow tire structure thus produced. A two-part bull ring, so-called, of proper formation to receive and support the basal beads of the tire is then applied to the latter and the whole is placed in a suitable mold which is introduced in the vulcanizing apparatus. The air bag is inflated to expand the tire to the full size of the mold, and the tire thus expanded under high pressure is subjected to the process of vulcanization. The beads of the tire being relatively larger in the unvulcanized than in the vulcanized state, it is necessary to force the bull-ring sections laterally toward each other when applying them to the beads, which operation frequently causes the buckling of the fabric or the sliding of one ply upon another. Thus the tire is distorted and ruined before its vulcanization. Moreover, much care, at the expense of considerable time, is required to apply the bull-ring sections to the tire.

The object of my invention is to eliminate the trouble just mentioned incident to the use of sectional bull-rings; and to that end I provide a unitary ring of novel construction that can be readily and effectually applied to the raw tire preparatory to the introduction of the latter in the mold; which ring may be used independently of, or in conjunction with, a sectional bull-ring, as desired.

The invention also comprises features of construction and operation which will be hereinafter described and claimed.

In the drawings—

Figure 1 is a transverse section of a portion of a mold structure containing a cord tire equipped with an internal inflatable bag and with a two-part bull-ring of ordinary construction, the basal bulges of the beads, when the tire is in a raw state before the application of the ring thereto, being indicated by dotted lines within the ring sections.

Fig. 2 is a similar section of a mold containing a tire, and adjuncts, equipped with a bead-supporting ring embodying my invention.

Fig. 3 is a side elevation, on a smaller scale, of my improved ring.

Fig. 4 is a cross-section through one side of the ring, as on the line 4—4 of Fig. 3.

Fig. 5 is a section similar to Fig. 2, but showing my novel ring combined with a two-part bull-ring.

Referring to Fig. 1 of the drawings, 10 designates the two annular parts of a tire mold structure, and 11 designates a tire of the "cord" type contained therein, said tire having the usual annular basal beads 12. 13 designates the two sections of an ordinary bull-ring which is applied to the underside of the tire so as to embrace and support the beads, and 14 designates the air-bag which is contained in the tire and is adapted to be inflated to expand the raw tube fully within the mold.

As previously mentioned the annular beads of the tire are reatively thicker in the raw than in the vulcanized state, such greater thickness as respects the underside of the beads being indicated by the dotted lines at 15 in Fig. 1; and since the sections of the bull-ring must be applied with great force to the said beads in opposite directions to each other from the respective sides of the tire, it frequently occurs that the fabric of the tire is buckled or displaced, in which case the tire is ruined before vulcanization.

According to my invention I provide a unitary basal ring of the character shown in Figs. 2, 3, 4 and 5; which ring is applied to the raw tire before the insertion of the latter in the mold 10. The ring thus associated with the tire and contained in the mold structure is illustrated in Figs. 2 and 5. This ring comprises a metal body 16 having formed thereon, at its respective edges, two circumferential flanges 17 which are spaced-apart correspondingly with the annular beads 12 of the tire, whereby when the ring is applied to the raw tire, as hereinafter described, the bases and outer sides of the respective beads 12 are effectually supported. The body 16 has also preferably formed therein, intermediate the flanges 17, a circumferential groove 18 which affords a retaining seat for the air-bag 14 contained within the tire. The body 16 is also provided at a suitable point with an aperture 19 for the passage of the usual air-conducting pipe to the air-bag.

The ring above described is split through at one point, as at 20, so that the ring may be contracted,—by forcibly sliding one end thereof past the other,—for ready insertion within the space encircled by the tire, and then be forced outward or expanded to its normal position in order to engage the bases and sides of the beads 12. The outward movement of the ring throughout its length thus being approximately radial, all liability of displacing or distorting the layers of fabric comprising the tire, is effectually obviated. When the ring is thus applied it supports the raw tire in annular form, and the whole is then inserted in the mold structure preparatory to the forming and vulcanizing operations, which structure is appropriately shaped and recessed to embrace and hold the ring, as shown. To remove the supporting ring from the vulcanized tire it is merely necessary to contract the ring and withdraw it laterally from the tire.

From the foregoing it will be seen that the application to the raw tire of the unitary split ring embodying my invention can be rapidly and accurately accomplished; whereas the application of the previous bull-ring construction is a tedious and troublesome operation.

As illustrated in Fig. 5 the split ring 16 may be used in conjunction with a two-part bull-ring 13, which is appropriately shaped to embrace the former; the mold parts in such case being constructed to receive the bull-ring.

I claim—

1. The combination with a mold structure for tires of rubber and cord construction having basal annular beads, of a bead-supporting ring adapted to be associated with and to form a separable part of the said structure, said ring comprising a unitary body having spaced circumferential bead-engaging flanges, said body and its flanges being split to permit contraction and expansion of the ring.

2. The combination with a mold structure for a tire of rubber and cord construction having basal annular beads and containing an inflatable bag, of a bead-supporting ring adapted to be associated with and to form a separable part of the said structure, said ring comprising a unitary body having spaced circumferential bead-engaging flanges and having also an intermediate circumferential groove affording a bag seat in the space between the beads, the said body and its flanges being split to permit contraction and expansion of the ring.

3. The herein described bead-supporting ring for use in the manufacture of tires composed of plies of rubber and cord, said ring comprising a unitary body having spaced circumferential bead-engaging flanges, said body including its flanges being split to permit contraction and expansion of the ring.

Signed at Cleveland, in the county of Cuyahoga and State of Ohio, this 2 day of December, A. D. 1920.

ARCHER H. HARRIS.